United States Patent
Bonitz et al.

(10) Patent No.: US 8,601,835 B2
(45) Date of Patent: Dec. 10, 2013

(54) METHOD FOR MAKING A LENS USING AN APPARATUS FOR PRECISE PRESSING BOTH SIDES OF THE LENS

(75) Inventors: Ralf Bonitz, Stadecken-Elsheim (DE); Rainer Adebahr, Gruenenplan (DE); Frank Peters, Delligsen (DE)

(73) Assignee: Doctor Optics SE (DE)

( * ) Notice: Subject to any disclaimer, the term of this patent is extended or adjusted under 35 U.S.C. 154(b) by 930 days.

(21) Appl. No.: 11/242,467

(22) Filed: Oct. 3, 2005

(65) Prior Publication Data

US 2006/0072208 A1     Apr. 6, 2006

(30) Foreign Application Priority Data

Oct. 6, 2004   (DE) ..................... 10 2004 048 500

(51) Int. Cl.
C03B 11/00      (2006.01)
C03B 11/06      (2006.01)

(52) U.S. Cl.
USPC ................................. 65/77; 65/66

(58) Field of Classification Search
USPC ......... 425/404, 408, 812; 428/409; 65/61, 62, 65/64, 66, 102, 275, 39, 221–226, 322, 65/162; 264/1.32–1.35
See application file for complete search history.

(56) References Cited

U.S. PATENT DOCUMENTS

| | | | |
|---|---|---|---|
| 2,398,676 A | | 4/1946 | Snyder |
| 3,764,797 A | * | 10/1973 | Krinke .......................... 362/510 |
| 4,698,089 A | | 10/1987 | Matsuzaka et al. |
| 4,836,840 A | * | 6/1989 | Hirota et al. ..................... 65/323 |
| 4,895,585 A | | 1/1990 | Angenent et al. |
| 5,713,975 A | | 2/1998 | Schonfeld et al. |
| 5,905,599 A | | 5/1999 | Nomura et al. |
| 6,382,822 B1 | | 5/2002 | Maekawa et al. |
| 6,406,171 B1 | | 6/2002 | Satsukawa et al. |
| 6,469,844 B1 | | 10/2002 | Iwase et al. |
| 6,898,026 B2 | | 5/2005 | Jewers et al. |
| 7,365,921 B2 | * | 4/2008 | Bonitz et al. .................. 359/811 |
| 2002/0062660 A1 | * | 5/2002 | Yoshikuni et al. ............. 65/25.1 |
| 2002/0109925 A1 | | 8/2002 | Miura |

(Continued)

FOREIGN PATENT DOCUMENTS

DE      1 142 992      1/1963
DE      11 42 992      1/1963

(Continued)

OTHER PUBLICATIONS

Certified English translation of FR 2415607 (certified Sep. 19, 2007).*

(Continued)

*Primary Examiner* — Jodi C Franklin
(74) *Attorney, Agent, or Firm* — Barnes & Thornburg LLP

(57) ABSTRACT

The method for making a lens with a first convex lens surface (32) and a second lens surface (33) includes feeding a glass melt drop into a concave mold (2, 10), precise pressing both sides of the glass melt drop in the concave mold (2, 10) together with a press die (20) and immersing the press die (20) in the glass melt drop so that a supporting rim (34) with predetermined dimensions, which protrudes beyond a highest point of the second lens surface (33), is formed on the lens by glass material displaced by the precise pressing. The apparatus for precise pressing includes an upper mold part (10) a lower mold part (2) and the press die (20).

15 Claims, 2 Drawing Sheets

(56) References Cited

U.S. PATENT DOCUMENTS

| | | | |
|---|---|---|---|
| 2003/0014999 A1* | 1/2003 | Koerner et al. | 65/127 |
| 2003/0209035 A1* | 11/2003 | Fujiwara et al. | 65/24 |
| 2005/0146797 A1 | 7/2005 | Bonitz et al. | |
| 2006/0260361 A1 | 11/2006 | Yoshida et al. | |

FOREIGN PATENT DOCUMENTS

| | | | | |
|---|---|---|---|---|
| DE | 2 410 923 | | 9/1974 | |
| DE | 295 01 341.9 | | 1/1995 | |
| DE | 195 10 195 | | 9/1996 | |
| DE | 196 33 164 | | 2/1998 | |
| DE | 100 01 860 | | 8/2000 | |
| DE | 100 23 754 | | 3/2001 | |
| DE | 100 43 065 | A1 | 3/2002 | |
| DE | 102 16 706 | | 11/2003 | |
| DE | 102 16 706 | A1 | 11/2003 | |
| DE | 203 20 546 | | 3/2005 | |
| EP | 0 308 010 | | 3/1989 | |
| EP | 0 901 029 | | 3/1999 | |
| FR | 2 415 607 | | 8/1979 | |
| FR | 2415607 | * | 8/1979 | C03B 11/08 |
| JP | 59157603 | | 9/1984 | |
| JP | 59177506 | | 10/1984 | |
| JP | 60-210533 | | 10/1985 | |
| JP | 01183611 | | 7/1989 | |
| JP | 6009231 | | 1/1994 | |
| JP | 9-208240 | | 8/1997 | |
| JP | 09208240 | | 8/1997 | |
| JP | 09235126 | | 9/1997 | |
| WO | WO 03/087893 | * | 10/2003 | G02B 3/00 |

OTHER PUBLICATIONS

JP 09-208240, JPO translation as provided by http://www4.ipdl.inpit.go.jp/Tokujitu/tjsogodbenk.ipdl on Aug. 25, 2009.*

Okawa, Koichi JP09208240 Aug. 12, 1997, English translation as provided by United States Patent and Trademark Office, Washington, D.C. Translated by: Schreiber Translations, Inc. Nov. 2010.*

Walter Doell. "High-Precision Machining of Dies for Compression Moulding". Division for Minimum-Damage Machining. Fraunhoefer Institut Werkstoffmechanik. Annual Report 1999.

"Optics and Optical Instruments—Preparation of Drawings for Optical Elements and Systems Part 5: Surface Form Tolerances" (ISO 10110-5: 1996; Technical Corrigendum 1: 1996). DIN ISO 10110-5. Feb. 2000. Standards Board for Precision Mechanics and Optics.

Definition of Lens, The American Heritage Dictionary, Fourth Edition, 2000 by Houghton Miflin Company, Updated in 2003.

Definition of Lens, Collins Essential Dictionary 2-nd Edition 2006, Harper Collins Publishers 2004, 2006.

Definition of Lens Wordnet 3.0, Farlez Clipart Collection, 2003-2008 Princeton Universisty, Farlex Inc.

Definition of Lens, Kermermann English Learner's Dictionary 1986-2008.

Definition of Lens, Webster's New World College Dictionary, 2005 by Wiley Publishing, Inc., Cleveland, Ohio.

Definition of Lens, Webster's New World Roget's A-Z Thesaurus, 1999 by Wiley Publishing Inc.

Definition of Lens, The Columbia Encyclopedia, Sixth Edition, 2008, Columbia University Press.

* cited by examiner

METHOD FOR MAKING A LENS USING AN APPARATUS FOR PRECISE PRESSING BOTH SIDES OF THE LENS

CROSS-REFERENCE

The invention described and claimed herein below is also described in German Patent Application 10 2004 048 500.3, which was filed on Oct. 6, 2004. This German Patent Application describes the invention described hereinabove and claimed in the claims appended herein below and provides the basis for a claim of priority for the instant invention under 35 U.S.C. 119.

BACKGROUND OF THE INVENTION

1. Field of the Invention

The present invention relates to a method of making a lens with a first convex lens surface and a second lens surface, especially for a motor vehicle headlight, in which a glass melt drop is supplied to a concave mold and both sides of the glass melt drop in the mold are precise pressed together with a press die. The invention also relates to an apparatus or tool for precise pressing both sides of the lens.

2. Related Art

Many lenses, especially those for motor vehicle headlights, do not need to fulfill the highest specifications, like those for objectives in optical lenses. On the other hand, the dimensions of the lenses that must be taken into account for the assembly must not vary. Furthermore the lenses must be economical to manufacture.

Usually those lenses are made by a single-side precise pressing method, i.e. a blank is heated, the aspheric side is pressed and the flat or planar side is after-worked by grinding and polishing. The technique for manufacturing single-side precise pressed optical components for the main motor vehicle headlight has matured, but is not suitable for mass production with a high productivity. This production technology is organized into a number of manufacturing steps, which occur during manufacturing according to the following sequence:

A. Batch preparation
B. Melting
C. Hot forming
D. Tempered cooling of the semi-finished product
E. Quality control
F. Packaging and delivery to the end user
1. Heating again
2. Pressing (one side to final shape)
3. Tempered Cooling
4. Grinding (second side plane)
5. Polishing (second side plane)
6. Faceting (edges, due to break off)
7. Packaging It has been shown that the feeder provides no exactly constant drop weight. The variation of the drop weight, which is from 100 to 200 g, is up to ±2%. Volume shrinkage occurs during the pressing process. These variations must not impair the installed dimensions of the formed lens.

A method for precise pressing optical components is known from DE 100 43 065 A1, in which excess material can escape into an unlimited free space, which is present between the lower and the upper mold part. A concentric ring arises on the glass part, which does not act on the optical characteristics of the precise pressed glass part. Differences in volume of the proportioned glass part can be balanced or compensated by different widths of the rim without problem. The width of the rim of the precise pressed glass part has hardly any effect on the optical functioning of the lens in contrast to changes in the thickness of the rim. However the rim does not protrude from the plane of the lens surface. A completely similar method, in which however a lens is made with two curved lens surfaces, is described in U.S. Pat. No. 4,698,089 A.

SUMMARY OF THE INVENTION

It is an object of the present invention to provide a method for manufacturing a lens for a motor vehicle headlight, which has a first convex lens surface and a second lens surface on opposite sides of the lens, is economical and guarantees constant installation dimensions.

It is also an object of the present invention to provide an apparatus for precise pressing a first convex lens surface and a second lens surface on opposite sides of the lens made by the method.

This object, and others which will be made more apparent hereinafter, are attained in a method of making a lens with a first convex, lens surface and a second lens surface, which comprises the steps of:

a) feeding a glass melt drop into a concave mold;
b) precise pressing both sides of the glass melt drop together in the concave mold with a press die; and
c) immersing the press die in the glass melt drop, so that a supporting rim with predetermined dimensions, which protrudes beyond a highest point of the second lens surface, is formed on the lens by glass material displaced by the precise pressing.

A lens with a supporting rim protruding beyond the highest point of the second lens surface is already known from DE 102 16 706 A1. However this reference does not provide any details of the manufacturing process.

The second lens surface can be convex, concave or plane. In the case of a convex lens surface the peak is understood to be the highest point of the second lens surface. In the case of a concave lens surface the rim of the lens surface is the highest point. The distance that the supporting rim protrudes is related to the second lens surface in the case of a plane lens surface. In that case the second lens surface has no contact with the supporting base when the supporting rim bears on the supporting base. The press die has a plane, convex or concave press die surface according to the shape of the second lens surface to be manufactured or made.

The installation dimensions are defined by the dimensions of the supporting rim: $R_H$=rim height, $R_B$=rim width and by the total height $H_G$ of the lens. The total height $H_G$ of the lens designates the height of the lens from the supporting surface of the supporting rim to the peak of the first convex lens surface.

The supporting rim should protrude by 0.2 mm from the highest point of the second lens surface. This feature is required so that the lens, which is precise pressed on both sides from the melt, subsequently can be deposited on a cooling conveyor, without damaging the second lens surface during the tempered cooling occurring on the cooling conveyor.

The method has the advantage that the installation dimensions are not influenced by material amount variations of the glass melt drop. Since the press die is immersed in the glass melt, the glass melt is also displaced radially and forced into a hollow chamber of the usually concave mold provided for formation of the supporting rim. When material variations occur only the distance between the aspheric surface and the second lens surface changes, while the total height $H_G$ of the lens and the other dimensions of the lens rim remain the same, because the displaced glass material is always pressed into the hollow chamber provided for that purpose.

That means that the material variations of the glass melt drop only affect the optical section of the lens, which can be tolerated since these lenses do not need to satisfy the more stringent specifications of objective lenses, since they are used especially for motor vehicle projection lenses.

The method of the present invention has the additional advantage that no semi-finished product must be produced first, which must then be subsequently precise pressed. For this purpose it would be necessary for example to heat the semi-finished product.

By the new manufacturing method for precise pressing both sides of a lens the process steps are successfully reduced to a minimum and with them the process costs. This method includes the following steps:

1. Supply of the glass melt drop
2. Hot forming (precise pressing both sides)
3. Tempered cooling
4. Quality control and packaging.

The precise pressing both sides of the lens previously seen as expensive is changed to a rapid and economical method for mass-producing the lenses when the precise pressing occurs directly from the melt. Moreover a supporting rim and a cooling process are of course required. This is not disadvantageous since this supporting rim can be used to establish the installation dimensions and no changes occur as a result of the amount variations during manufacture.

In a preferred embodiment of the method the precise pressing of both sides is performed when the glass melt drop has an initial viscosity of $10^4$ to $10^6$ dPas. The term "initial viscosity" means that viscosity, which the glass melt has at the start of the precise pressing process, i.e. prior to immersion of the press die.

Preferably the lenses are precise pressed with a diameter of 50 to 80 mm on both sides.

The apparatus for precise pressing of lenses, especially for motor vehicle headlights, according to the invention has a lower mold part, which comprises a concave basin, a circumferential horizontal shoulder connected with the concave basin and a vertical peripheral rim extending from the horizontal shoulder. The upper mold part of the apparatus bears on a facing surface of the lower mold part and protrudes inwardly over and/or in the vicinity of the horizontal shoulder. Furthermore the apparatus has a press die. The height of the supporting rim of the lens is defined by the shoulder and upper mold part.

A three part apparatus comprising an upper part, a lower part and a press die is known from JP 60-09231 A (Abstract). However among other things, the part of the surface coming in contact with the glass is not provided with a shoulder and vertical peripheral rim.

In a preferred embodiment of the apparatus for precise pressing lenses the press die is stationary, while the lower mold part is movable in a vertical direction. Preferably the upper mold part is also movable in the vertical direction and the press die guides the upper mold part, which means that the inner diameter of the upper mold part corresponds to the outer diameter of the press die. The arrangement has the advantage that the optical properties of the lens that is prepared can be guaranteed, because tilting of the optic axes of both lens surfaces can be avoided.

Preferably the diameter of the press die is less than or equal to the diameter of the concave basin. The width of the supporting rim may be adjusted by means of the changes in the diameter of the upper mold part and of the press die.

Preferably the press die has a plane surface on its underside.

BRIEF DESCRIPTION OF THE DRAWING

The objects, features and advantages of the invention will now be illustrated in more detail with the aid of the following description of the preferred embodiments, with reference to the accompanying figures in which.

DETAILED DESCRIPTION OF THE INVENTION

Figure 1:
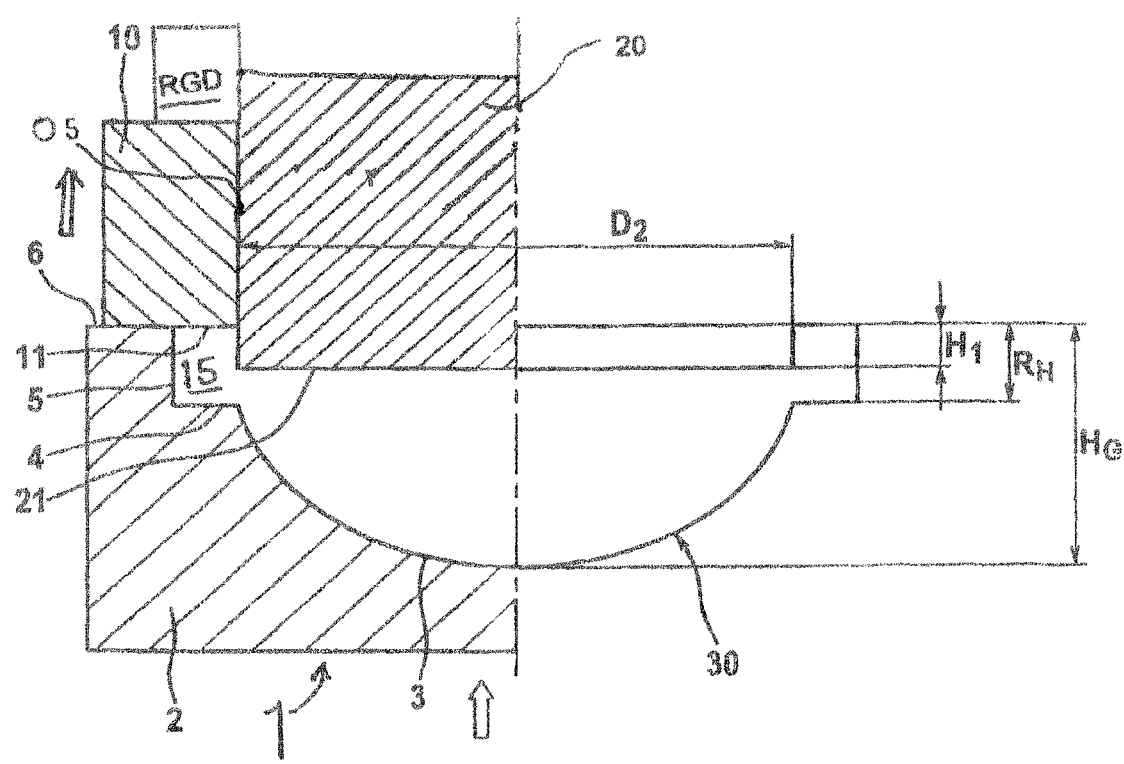
FIG. 1 is a cross-sectional view of a precise pressing apparatus and a lens in it during a step in the formation of the finished lens.

A precise pressing apparatus 1 is shown in cross-section on the left side of FIG. 1. This precise pressing apparatus comprises a lower mold part 2, an upper mold part 10, and a press die 20 of a diameter D2. A piano-convex lens 30 is made with this precise pressing apparatus 1, which can be used for a motor vehicle projection headlight.

The lower mold part 2 has an aspheric concave basin 3, a circumferential horizontal shoulder 4 extending around the concave basin and a vertical peripheral rim 5 extending up from the horizontal shoulder 4. The upper mold part 10 comprises a mold ring that bears with its horizontal lower surface 11 on the horizontal facing surface 6 of the lower mold part 2. The horizontal lower surface 11 extends inward and over the horizontal shoulder 4 to form intervening space 15. The distance between the horizontal shoulder 4 and the underside of the mold ring defines the height $R_H$ of the supporting rim 34 of the lens 30.

In order to guarantee the optical properties of the lens 30 and to avoid tilting of the optic axis from the top side to the bottom side of the lens, the press die 20 is stationary or mounted in a fixed position in the apparatus. The upper mold part 10 is attached to the apparatus by means of a resilient suspension device RGD mounted on the press die outer side OS. After filling with the glass melt drop the lower mold part 2 travels up toward the press die 20 in a vertical direction without tilting to the upper mold part 10, then passes beyond the press die lower side and bears on the upper mold part 10. The upper mold part 10 is forced upward against the action of the resilient suspension device RGD during the press die guiding, so that the press die 20 is immersed in the glass melt.

The glass melt is forced out into the intervening space 15 between shoulder 4 and the lower side 11 of the upper mold part 10 by immersion of the lower side 21 of the press die 20 in the glass melt drop. The volume of the glass melt drop is selected to be greater than that of the concave basin 3. The press die 20 is immersed more or less deeply in the glass melt because of material amount fluctuations or variations so that only the distance between the plane lens surface 33 and the aspheric lens surface 32 is changed, but not the dimensions of the supporting rim 34, since the lower surface 11 of the mold ring and the shoulder 4 always have the same spacing, independent of the amount of material in the glass melt drop.

Figure 2A:
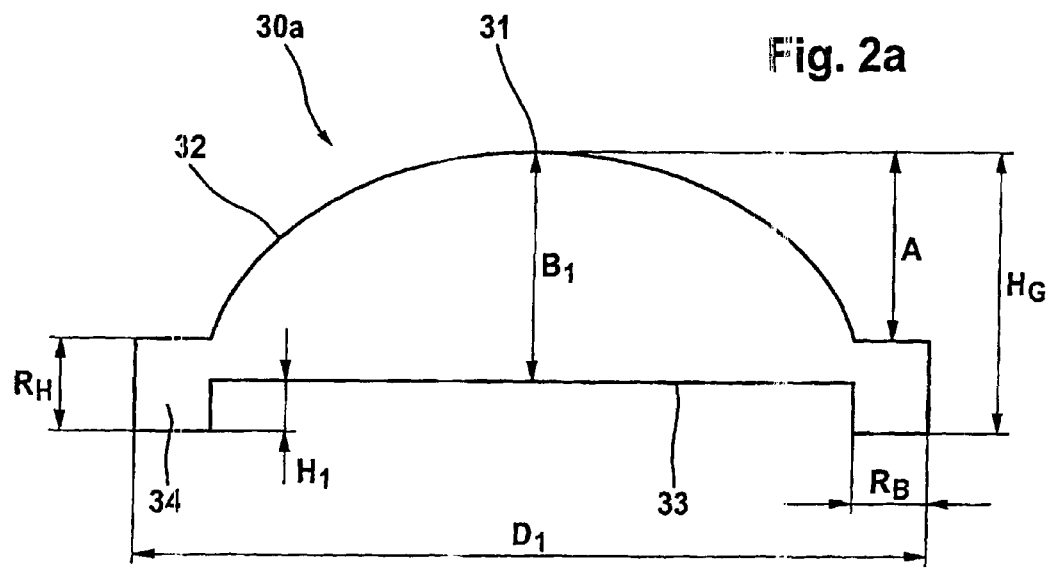
FIGS. 2a and 2b are two embodiments of a lens for a motor vehicle headlight made by the method according to the invention.
Figure 2B:
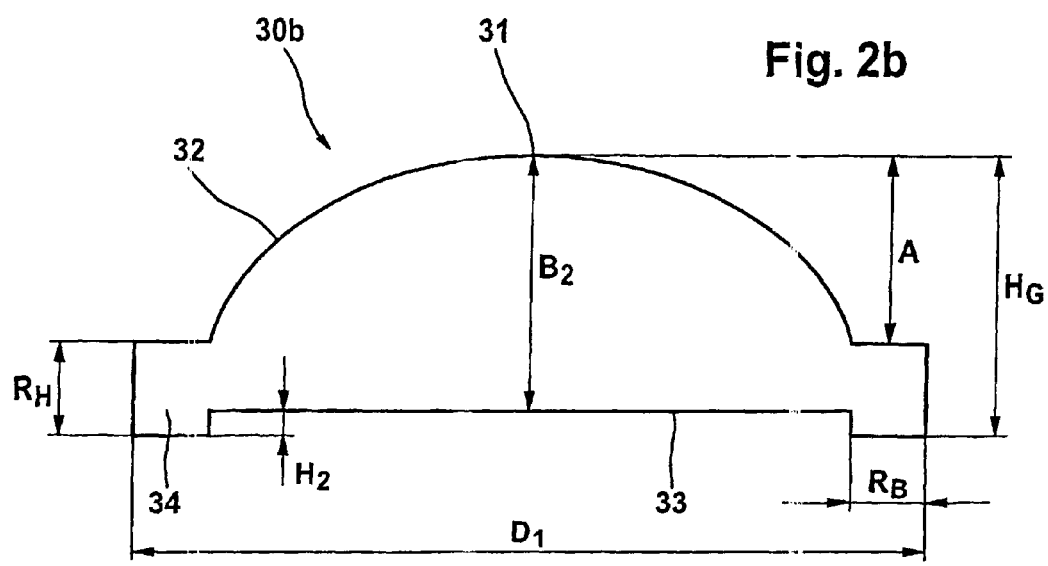

How this different extent of immersion of the press die 20 is noticeable in the finished lenses 30a, 30 b is explained with the aid of FIGS. 2a and 2b.

In FIG. 2a a lens 30a is shown, which has a diameter $D_1$. The aspheric part 32 has a height A and a spacing to the plane lens surface 33 of $B_1$. The total height amounts to $H_G$. The supporting rim 34 has a height $R_H$ and a height to the plane lens surface 33 of $H_1$.

When more material is available to make the lens in comparison to the material for the lens 30a shown in FIG. 2a, a lens 30b according to FIG. 2b is produced, whose dimensions A, $H_G$, $R_B$ and $R_H$ correspond to the same dimensions of the lens 30a in FIG. 2a. The material variations are only noticeable in the height $B_2$ of the lens 30b and the height $H_2$ of the supporting rim 34, which are changed in relation to the height $B_1$ and the height $H_1$ of the lens 30a. These dimension changes are exaggerated in the FIGS. 2a and 2b. It is seen that the dimensions $R_B$, $R_H$ and $H_G$ for the assembled positions in the fitting of the lens remain unchanged so that a change only occurs in the optical section, i.e. in the region between the plane lens surface 33 and the peak 31 of the aspheric part 32 of the lens.

For example for drop weight fluctuations of +/−1 g with a press die diameter of 70 mm and a glass density of 2.5 g/cm³ a height variation $\Delta H=H_1-H_2$ of the supporting rim for the optic plane surface amounts to +/−0.1 mm.

PARTS LIST 1 precise pressing apparatus
2 lower mold part
3 aspheric basin
4 horizontal shoulder
5 peripheral rim
6 facing surface
10 upper mold part
11 lower side
15 intervening space
20 press die
21 lower side of the press die
30a, 30b lens
31 peak of the aspheric lens part
32 first lens surface
33 second lens surface
34 supporting rim
D1 lens diameter
D2 press die diameter While the invention has been illustrated and described as embodied in a method for making a lens and an apparatus for precise pressing both sides of the lens, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:
1. A method of making a lens with guaranteed optical properties, the lens having a convex lens surface and a planar lens surface, especially for a motor vehicle headlight, said method comprising the steps of:
(a) providing an apparatus for making the lens, said apparatus including
a lower mold part comprising a concave basin, a circumferential horizontal shoulder extending around the concave basin and a vertical peripheral rim extending vertically from the horizontal shoulder, and a horizontal facing surface on the vertical peripheral rim;
an upper mold part provided with a cylindrical inner surface and comprising a mold ring, which bears with a horizontal lower surface on the horizontal facing surface of the lower mold part during precise pressing of the lens, said horizontal lower surface of the upper mold part extending inward and over the circumferential horizontal shoulder to form an intervening space adjacent to the concave basin so that said intervening space is bounded by the horizontal lower surface, the horizontal shoulder, and the vertical peripheral rim; and
a press die having a planar underside and a cylindrical outer surface with a diameter;
wherein said cylindrical inner surface of said upper mold part has an inside diameter that corresponds to the diameter of the press die;
(b) feeding a glass melt drop into the concave basin;
(c) after the feeding of step (b), precise pressing both sides of the glass melt drop in the concave basin together with the upper mold part and the press die;
(d) during the precise pressing of the lens immersing the press die in the glass melt drop during the precise pressing so that a part of the glass material is displaced into the intervening space to form a supporting rim with predetermined installation dimensions on the lens, and so that the supporting rim protrudes beyond a highest point of the planar lens surface.

2. The method as defined in claim 1, wherein the precise pressing of the both sides of the glass melt drop together is performed when the glass melt drop in the concave basin has a viscosity of from $10^4$ to $10^6$ dPas.

3. The method as defined in claim 2, wherein the lens has a diameter of at least 50 mm.

4. The method as defined in claim 2, wherein the glass melt drop has weight fluctuation of at least ±1 g.

5. The method as defined in claim 2, wherein the lens has a diameter of from 50 mm to 80 mm.

6. The method as defined in claim 1, wherein the lens has a diameter of at least 50 mm.

7. The method as defined in claim 1, wherein the lens has a diameter of from 50 mm to 80 mm.

8. The method as defined in claim 1, wherein the glass melt drop has weight fluctuation of at least ±1 g.

9. A method of making a lens with guaranteed optical properties, the lens having a convex lens surface and a planar lens surface, especially for a motor vehicle headlight, said method comprising the steps of:
(a) providing an apparatus for making the lens, said apparatus including
a lower mold part comprising a concave basin, a circumferential horizontal shoulder extending around the concave basin and a vertical peripheral rim extending vertically from the horizontal shoulder, and a horizontal facing surface on the vertical peripheral rim;
an upper mold part provided with a cylindrical inner surface and comprising a mold ring, which bears with a horizontal lower surface on the horizontal facing surface of the lower mold part during precise pressing of the lens, said horizontal lower surface of the upper mold part extending inward and over the circumferential horizontal shoulder to form an intervening space adjacent to the concave basin so that said intervening space is bounded by the horizontal lower surface, the horizontal shoulder, and the vertical peripheral rim; and a press die having a planar underside and a cylindrical outer surface with a diameter;

wherein said cylindrical inner surface of said upper mold part has an inside diameter that corresponds to the diameter of the press die;

(b) feeding a glass melt drop into the concave basin;

(c) after the feeding of step (b) at a viscosity of the glass melt drop from $10^4$ to $10^6$ dPas, precise pressing the lens between lower mold part and the upper mold part and the press die while immersing the press die in the glass melt drop so that a part of the glass material is displaced into the intervening space to form a supporting rim on the lens, and so that the supporting rim protrudes beyond a highest point of the planar lens surface.

10. The method as defined in claim 9, wherein the glass melt drop has weight fluctuation of at least ±1 g.

11. The method as defined in claim 9, wherein the lens has a diameter of at least 50 mm.

12. The method as defined in claim 11, wherein the glass melt drop has weight fluctuation of at least ±1 g.

13. The method as defined in claim 9, wherein the lens has a diameter of from 50 mm to 80 mm.

14. A method of making a first and second lens with guaranteed optical properties, the first and second lens having a convex lens surface and a planar lens surface, especially for a motor vehicle headlight, said method comprising the steps of:

(a) providing an apparatus for making the lens, said apparatus including a lower mold part comprising a concave basin, a circumferential horizontal shoulder extending around the concave basin and a vertical peripheral rim extending vertically from the horizontal shoulder, and a horizontal facing surface on the vertical peripheral rim;

an upper mold part provided with a cylindrical inner surface and comprising a mold ring, which bears with a horizontal lower surface on the horizontal facing surface of the lower mold part during precise pressing of the lens, said horizontal lower surface of the upper mold part extending inward and over the circumferential horizontal shoulder to form an intervening space adjacent to the concave basin so that said intervening space is bounded by the horizontal lower surface, the horizontal shoulder, and the vertical peripheral rim; and a press die having a planar underside and a cylindrical outer surface with a diameter;

wherein said cylindrical inner surface of said upper mold part has an inside diameter that corresponds to the diameter of the press die;

(b) feeding a glass melt drop into the concave basin;

(c) after the feeding of step (b), precise pressing both sides of the glass melt drop in the concave basin together with the upper mold part and the press die;

(d) during the precise pressing of the lens immersing the press die in the glass melt drop a first distance so that a part of the glass material is displaced into the intervening space to form a supporting rim with predetermined installation dimensions on the lens, and so that the supporting rim protrudes beyond a highest point of the planar lens surface and so that a first lens is made; and (e) making a second lens by repeating steps (a)-(c) and then (f) during the precise pressing of the lens immersing the press die in the glass melt drop a second distance so that a part of the glass material is displaced into the intervening space to form a supporting rim with predetermined installation dimensions on the lens, and so that the supporting rim protrudes beyond a highest point of the planar lens surface and so that a second lens is made.

15. The method as defined in claim 14, wherein the glass melt drop has weight fluctuation of at least ±1 g.

* * * * *

UNITED STATES PATENT AND TRADEMARK OFFICE
CERTIFICATE OF CORRECTION

| | | |
|---|---|---|
| PATENT NO. | : 8,601,835 B2 | Page 1 of 1 |
| APPLICATION NO. | : 11/242467 | |
| DATED | : December 10, 2013 | |
| INVENTOR(S) | : Ralf Bonitz, Rainer Adebahr and Frank Peters | |

It is certified that error appears in the above-identified patent and that said Letters Patent is hereby corrected as shown below:

On the title page, at Item (73), change the spelling of the assignee to --Docter Optics SE (DE)--

Signed and Sealed this
Twenty-second Day of July, 2014

Michelle K. Lee
*Deputy Director of the United States Patent and Trademark Office*